United States Patent [19]

Nakazawa et al.

[11] Patent Number: 4,771,979
[45] Date of Patent: Sep. 20, 1988

[54] EQUILIBRATOR FOR UNIVERSAL HEAD

[75] Inventors: Shouji Nakazawa; Kuniaki Tan, both of Kanagawa; Akio Miura, Tokyo, all of Japan

[73] Assignee: Shotoku Ltd., Japan

[21] Appl. No.: 52,554

[22] Filed: May 21, 1987

[30] Foreign Application Priority Data

May 23, 1986 [JP] Japan .................. 61-117199

[51] Int. Cl.⁴ .............................. F16M 13/00
[52] U.S. Cl. .................. 248/578; 248/185; 248/292.1; 354/293
[58] Field of Search ............... 248/578, 575, 177, 178, 248/183, 184, 185, 179, 180, 181, 278, 284, 292.1, 291, 417, 1 I; 354/293, 294; D16/45, 46

[56] References Cited

U.S. PATENT DOCUMENTS

| | | | |
|---|---|---|---|
| 1,862,755 | 6/1932 | Madsen | 248/417 X |
| 3,223,376 | 12/1965 | Ciuffini et al. | 248/417 |
| 3,385,550 | 5/1968 | Doerner | 248/417 |
| 3,845,928 | 11/1974 | Barrett et al. | 248/291 |
| 4,447,033 | 5/1984 | Jaumann et al. | 248/563 |
| 4,466,590 | 8/1984 | Parks et al. | 248/584 X |
| 4,673,268 | 6/1987 | Wheeler et al. | 248/183 X |

FOREIGN PATENT DOCUMENTS

| | | | |
|---|---|---|---|
| 2701520 | 7/1977 | Fed. Rep. of Germany | 248/183 |
| 439623 | 9/1948 | Italy | 248/574 |
| 83791 | 5/1982 | Japan. | |
| 192698 | 11/1982 | Japan. | |

Primary Examiner—David L. Talbott
Attorney, Agent, or Firm—Steinberg & Raskin

[57] ABSTRACT

An equilibrator for a universal head which is simple in construction, light-weight, and small-sized. The equilibrator includes a cylindrical cam which has an axis extending in a substantially horizontal direction, and is mounted on a base so as to be rotatable about the axis, and having a cam surface formed on an end thereof, in addition to a compression spring which is arranged so as to be substantially coaxial with the cylindrical cam and resiliently engaged with the cam surface of the cylindrical cam. The cam surface has a configuration sufficient to allow the balance between the force transmitted to the cam surface due to the inclination of the universal head and the restoring force of the spring, to be kept at any inclination of the universal head.

10 Claims, 2 Drawing Sheets

EQUILIBRATOR FOR UNIVERSAL HEAD

BACKGROUND OF THE INVENTION

The present invention relates to an equilibrator for a universal head, and more particularly to an improvement in an equilibrator for a universal head on which a camera such as a movie camera, a TV camera, or the like is supportedly mounted.

Typical examples of conventional equilibrators which have been previously used are disclosed in Japanese Patent Application Laid-Open Publication No. 192698/1982 and Japanese Patent Application Laid-Open Publication No. 83791/1982. However, the conventional equilibrators disclosed suffer from significant disadvantages in that they are extremely difficult to handle, due to their complicated structure, heavy weight, and large size.

Accordingly, it would be highly desirable to develop an equilibrator for a universal head which is simply constructed, light-weight, and small-sized.

SUMMARY OF THE INVENTION

Accordingly, it is an object of the present invention to provide an equilibrator for a universal head which is simple in construction, light-weight, and small-sized.

It is another object of the present invention to provide an equilibrator for a universal head which is capable of being applied to cameras of different weights or sizes.

It is a further object of the present invention to provide an equilibrator for a universal head which is capable of supporting a camera so that photographing can be carried out with greatly improved efficiency.

It is still another object of the present invention to provide an equilibrator for a universal head which is capable of operating with great reliability, irrespective of the weight and size of a camera.

It is yet another object of the present invention to provide an equilibrator for a universal head which is capable of accomplishing the above-noted objects with simple structure.

Other objects and advantages of the present invention will become apparent from the following description below.

Specifically, an equilibrator for a universal head is provided in accordance with the present invention. The equilibrator includes a base for rotatably or inclinably supporting a universal head thereon, and a cylindrical cam having an axis extending in a substantially horizontal direction and mounted on the base so as to be rotatable about the axis. The cylindrical cam is provided on an end surface thereof with a cam surface. Force produced due to the inclination of the universal head is transmitted to the cam surface of the cylindrical cam through transmission means.

In a preferred embodiment of the present invention, the transmission means comprise a substantially horizontal shaft through which the cylindrical cam is mounted on the base and about which the cylindrical cam is rotated, with the universal head being fixedly fitted on the shaft. The equilibrator also includes a compression spring arranged so as to be substantially coaxial with the cylindrical cam and resiliently engaged or coupled with the cam surface of the cylindrical cam. The cam surface has a configuration sufficient to cause or allow the balance between the force transmitted to the cam surface due to the inclination of the universal head and the restoring force of the compression spring, to be maintained at any inclination of the universal head.

BRIEF DESCRIPTION OF THE DRAWINGS

For a fuller understanding of the present invention, reference is made to the following description taken in connection with the accompanying drawings in which like reference numerals designate like or corresponding parts therethroughout. In the drawings.

DESCRIPTION OF THE PREFERRED EMBODIMENTS

An equilibrator for the universal head according to the present invention will be described below, with reference to the accompanying drawings.

Figure 1:
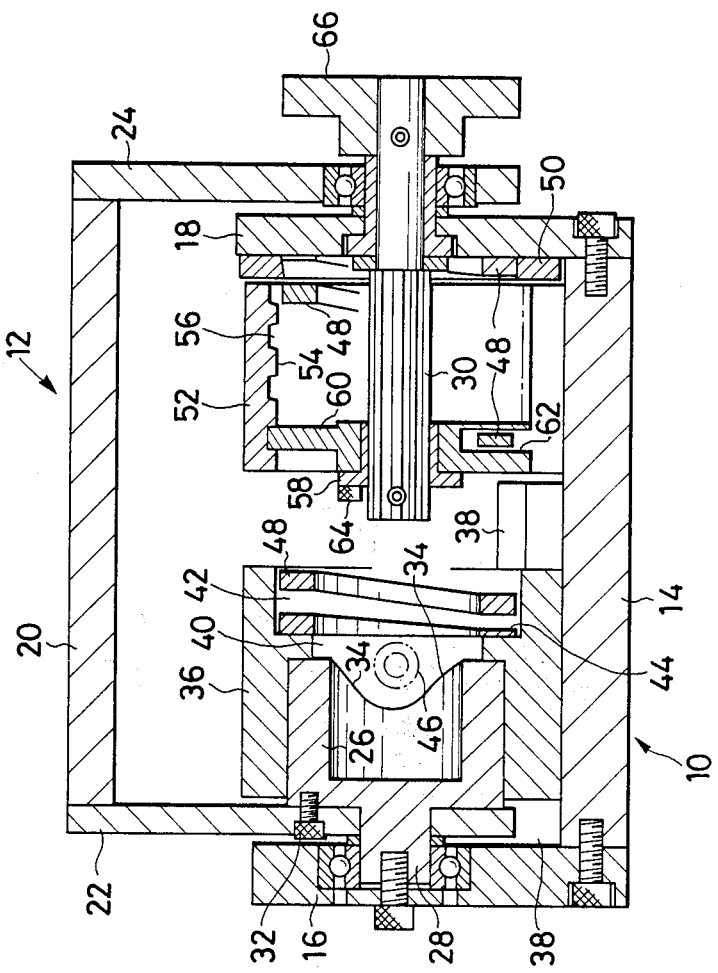
FIG. 1 is a vertical, sectional view illustrating an embodiment of an equilibrator for a universal head according to the present invention.

FIG. 1 illustrates an embodiment of an equilibrator according to the present invention, in which an equilibrator and a universal head are generally designated by reference numerals 10 and 12 respectively. The equilibrator 10 of the illustrated embodiment includes a base 14 and pair of substantially vertical supports 16 and 18 mounted on both sides of the base 14 so as to extend upwardly therefrom and extend substantially parallel to each other. The universal head 12 which is supported on the equilibrator 10 of the illustrated embodiment, is generally formed in an inverted U-shape. More particularly, the universal head 12 includes a support plate 20 which is adapted to support a camera (not illustrated) such as a movie camera, a TV camera, or the like thereon, and a pair of substantially vertical plates 22 and 24 extending downwardly from both sides of the support plate 20 and interposedly supporting the plate 20 therebetween. The vertical plates 22 and 24 are arranged so as to be opposite to the respective vertical support plates 16 and 18 of the equilibrator 10. Also, the plates 22 and 24 are positioned so as to be substantially coaxially rotatable together, as described below.

The equilibrator 10 of the illustrated embodiment also includes a cylindrical cam 26 fixedly mounted on a horizontal shaft 28 rotatably supported on an inner surface of the vertical support 16, and a spline shaft 30 rotatably inserted through the vertical support 18 in a substantially horizontal direction and arranged so as to be substantially coaxial with the shaft 28. Thus, the cylindrical cam 26 is adapted to be rotatable about the shaft 28.

The vertical plate 22 is fitted on the shaft 28 between the vertical support 16 and the cylindrical cam 26, and fixed with respect to the shaft 28 and the cylindrical cam 26 by means of a bolt 32, so that the vertical support 16 may be rotated with the cylindrical cam 26 about the shaft 28. The vertical plate 24 is rotatably fitted on the split shaft 30 at the outside of the vertical support 18, so that the vertical plate 24 may be rotated or pivoted about the spline shaft 30. Thus, the support plate 20 is rotatable or inclinable through the vertical plates 22 and 24 about the shaft 28 and spline shaft 30 which are substantially coaxial with each other.

Figure 2:
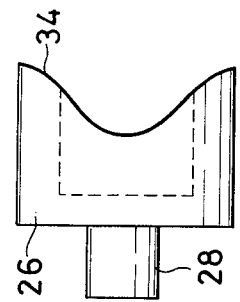
FIG. 2 is a side elevation view illustrating a cylindrical cam incorporated into the equilibrator illustrated in FIG. 1.

The cylindrical cam 26, as illustrated in FIG. 2, is formed on an end surfacd thereof with a cam surface 34, which will be described in greater detail below.

The equilibrator 10 also includes a hollow spring bearing cylinder 36 which, in the illustrated emodiment, is movably fitted on the cylindrical cam 26 and adapted to be slidably reciprocated on the cam 26 in the axial direction of the cam 26 or shaft 28 along a guide 38 mounted on the base 14. The cylinder 36 is provided therein with an internal cylindrical space which is divided into a reduced internal space 40 and an enlarged internal space 42, by means of a shoulder 44. The reduced internal space 40 is provided with a cam follower 46 of a roller-like shape. A side portion of a coil-like compression spring 48 is received in the enlarged internal space 42, so as to be compressible in the axial direction of the cylinder 36. The compression spring 48 is securely abutted at an end thereof against the shoulder 44.

The cam follower 46 is mounted at a tip of the compression spring 48, so that the cam follower 46 may be forced against the cam surface 34, due to action of the spring 48. The other end of the spring 48 abuts through a spring positioning ring 50, against the inner surface of the vertical support 18. The spring positioning ring 50 serves to securely engage the spring 48 with the vertical support 18. Thus, it is noted that the compression spring 48 is compressibly actuated due to the sliding movement of the spring bearing cylinder 36 on the cylindrical cam 26 through the engagement between the cam surface 34 and the cam follower 46.

The equilibrator 10 of the illustrated embodiment further includes a spring adjustment casing 52 fixed on the base 14, and substantially coaxially or concentrically positioned with respect to the spline shaft 30, in addition to having a cylindrical inner surface 54 thereof which is formed with an internal thread 56. Another side portion of the compression spring 48 is received in the spring adjustment casing 52 opposite to the side portion thereof received in the cylinder 36. Also, the spline shaft 30 has a bushing 58 fitted thereon in such a manner that it is variable or adjustable in an axial direction thereof when the shaft 30 is rotated.

Reference numeral 60 designates a twist disc fixedly fitted on the bushing 58. The twist disc 60 is fitted at an outer periphery thereof in the internal thread 56 of the spring adjustment casing 52, and is formed, on at least a part of its outer periphery, with a groove 62 in which a part of the spring 48 is adapted to be loosely or variably (adjustably) fitted. Thus, it is noted that the twist disc 60 is so arranged that it is thrust into the spring 48 through the engagement between the spring 48 and the groove 62 thereof, while the twist disc 60 is movably or variably engaged at its periphery with the internal thread 56 of the casing 52.

Reference numerals 64 and 66 respectively designate a bolt for fixedly mounting the twist disc 60 on the bushing 48, and an adjustment handle mounted at an outer end of the spline shaft 30.

In the present invention, it is necessary that the cam surface 34 of the cylindrical cam 26 have a configuration sufficient to cause or allow the balance between the force transmitted to the cam surface 34 through the shaft 28 due to the inclination of the universal head 12, and the restoring force of the compression spring 48, to be kept or maintained at any inclination of the universal head 12. For this purpose, in the illustrated embodiment, the cam surface 34 as illustrated in FIG. 2, is formed with a bell-curved or valley-like shape, although the cam surface 34 is not limited to such a configuration.

The manner of operation of the equilibrator 10 of the illustrated embodiment constructed as described above, will now be described below.

When a camera supported on the support plate 20 of the universal head 12 is operated so as to be inclined at a certain desired angle, the universal head 12 is correspondingly pivoted about the shaft 28 and spline shaft 30 which are substantially coaxial. This causes the cylindrical cam 26 to be rotated at an angle, so as to compressibly actuate the compression spring 48 through the engagement between the cam surface 34 of the cylinder cam 26 and the cam follower 46, so that a balance between the force transmitted to the cam surface due to the inclination of the universal head 12 and the restoring force of the actuating spring 48 may be established, so as to stably retain the universal head 12 at its inclined position.

When a camera of different weight and/or size is mounted on the universal head 12, it is necessary to vary a spring constant. This is accomplished by operating the adjustment handle 66. More particularly, operation of the handle 66 causes the spline shaft 30 to revolve so as to slidably move the twist disc 60 along the spline shaft 30 in the axial direction thereof, while the twist disc 60 is being rotated along the internal thread 56 of the spring adjustment casing 52. This results in a portion of the spring 48 engaged with the twist disc 60 being positionally varied so as to cause an effective length of the compression spring 48 between one end thereof abutting against the shoulder 44, and a portion thereof engaged with the twist disc 60, to be varied to determine the desired spring constant. Thus, the equilibrator of the illustrated embodiment eliminates the need for replacing the compression spring 48 with another spring having a different spring constant, even when a camera of different weight and/or size is mounted on the universal head 12.

As can be seen from the foregoing, the equilibrator 10 of the embodiment is so constructed that pivotal movement of the universal head 12 due to inclination is converted into linear movement of the compression spring 48 in the axial direction thereof, by means of the cylindrical cam 26. Such construction permits the overall equilibrator to be small-sized and lightweight. Also, in the illustrated embodiment, the spring constant can be readily changed by merely varying an effective length of the compression spring 48, by means of the twist disc 60 engaged with the spring 48. This not only further reduces the size and weight of the equilibrator, but also eliminates the need to replace the spring every time a camera with a different size or weight is mounted.

In addition, this embodiment greatly simplifies the equilibrium mechanism, because it is merely necessary to determine the configuration of the cam surface to allow the balance between the force transmitted to the cam surface due to the inclination of the universal head 12, and the restoring force of the compression spring 48, to be maintained at any inclination of the universal head. Furthermore, the illustrated embodiment causes the compression spring 48 to be stably actuated, even when any force is applied thereto, because the spring 48 is substantially received in the spring bearing cylinder 36 and spring adjustment casing 52, as illustrated.

Figure 3:
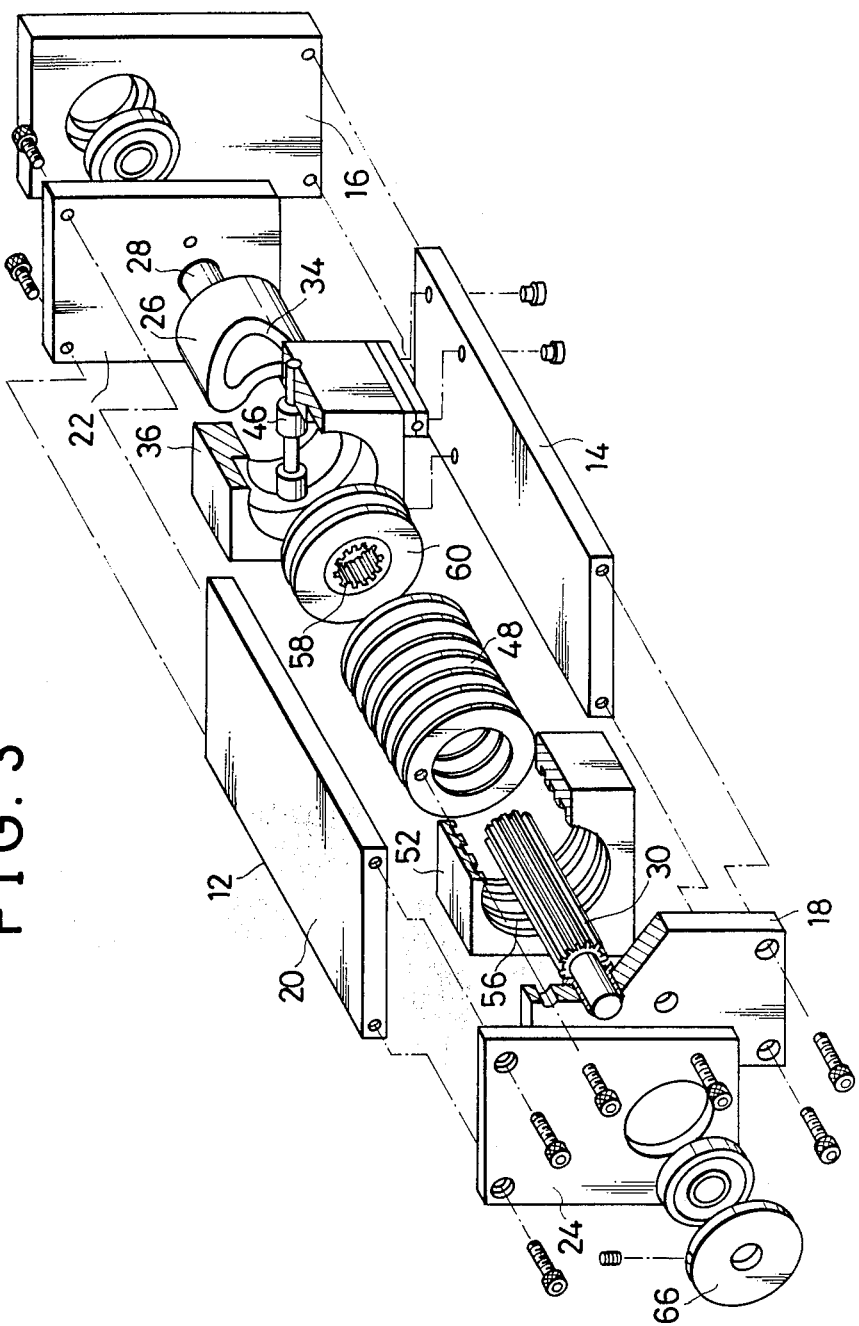
FIG. 3 an exploded, perspective view illustrating another embodiment of an equilibrator for a universal head according to the present invention.

FIG. 3 illustrates another embodiment of an equilibrator according to the present invention. The embodiment illustrated in FIG. 3 is substantially the same as that illustrated in FIG. 1, with the exception that certain members such as the spring positioning ring 50 in the embodiment of FIG. 1 have been eliminated therefrom. Thus, it is noted that the embodiment of FIG. 3 exhibits substantially the same advantages as that of FIG. 1, and functions in substantially the same manner.

It is thus seen that the objects set forth above, among those made apparent from the preceding description, are efficiently attained, while certain changes may be made in the above construction without departing from the spirit and scope of the present invention. It is intended that the preceding description above and illustrated in the accompanying drawings, shall be interpreted as merely illustrative, and not in a limiting sense. Therefore, the preceding description of the present invention is merely exemplary, and is not intended to limit the scope in any way.

We claim:

1. An equilibrator for a universal head, comprising:
   a base for inclinably supporting the universal head thereon;
   a cylindrical cam having an axis extending in a substantially horizontal direction and mounted on said base so as to be rotatable about said axis, said cylindrical cam having a cam surface formed on an end thereof;
   transmission means for transmitting force produced due to the inclination of the universal head to said cylindrical cam, said transmission means comprising a shaft through which said cylindrical cam is mounted on said base and about which said cylindrical cam is rotated, the universal head being fixedly fitted on said shaft;
   a compression spring arranged so as to be substantially coaxial with said cylindrical cam and resiliently engaged with said cam surface of said cylindrical cam;
   said cam surface having a configuration sufficient to allow balance between the force transmitted to said cam surface due to the inclination of the universal head and restoring force of said spring to be maintained at any inclination of the universal head;
   a spline shaft arranged so as to be substantially coaxial with said cylindrical cam and rotatable about an axis thereof;
   a twist disc fitted on said spline shaft so as to be slidable in an axial direction of said spline shaft and variably engaged with a part of said compression spring; and
   a spring adjustment casing fixed on said base and receiving another side portion of said compression spring and said twist disc therein,
   said spring adjustment casing being formed on an inner surface thereof with an internal thread through which said twist disc is variably engaged at an outer periphery thereof with said spring adjustment casing.

2. The equilibrator of claim 1, additionally comprising an adjustment handle,
   wherein said spline shaft is actuated by means of said adjustment handle.

3. The equilibrator of claim 1, further comprising
   a spring positioning ring for securely positioning a base end of said compression spring.

4. The equilibrator of claim 1, wherein said twist disc comprises a groove on at least a part of said outer periphery thereof; in which said part of said spring is variably or adjustably fitted.

5. The equilibrator of claim 1, additionally comprising
   a substantially vertical support mounted upon said base and through which said spline shaft is rotatably inserted.

6. The equilibrator of claim 5, wherein a downwardly extending plate of the universal head is rotatably fitted on said spine shaft on a side of said substantially vertical support opposite said compression spring.

7. An equilibrator for a universal head, comprising:
   a base for inclinably supporting the universal head thereon;
   a cylindrical cam having an axis extending in a substantially horizontal direction and mounted on said base so as to be rotatable about said axis, said cylindrical cam having a cam surface formed on an end thereof;
   transmission means for transmitting force produced due to the inclination of the universal head to said cylindrical cam;
   a compression spring arranged so as to be substantially coaxial with said cylindrical cam and resiliently engaged with said cam surface of said cylindrical cam; and
   a spring bearing cylinder fitted on said cylindrical cam so as to be substantially coaxial with said cylindrical cam and slidable thereon,
   said spring bearing cylinder receiving a side end portion of said compression spring therein which causes actuation of said compression spring to be carried out through sliding movement of said spring bearing cylinder on said cylindrical cam;
   said cam surface having a configuration sufficient to allow balance between the force transmitted to said cam surface due to the inclination of the universal head and restoring force of said spring to be maintained at any inclination of the universal head.

8. The equilibrator of claim 7, wherein said spring bearing cylinder comprises an internal space, and
   a shoulder dividing said internal space into a reduced internal space portion and an enlarged internal space portion,
   with said side end portion of said compression spring abutting against said shoulder, and
   said compression spring comprising a cam follower provided at a tip thereof within said reduced internal space portion.

9. An equilibrator for a universal head, comprising:
   a base for inclinably supporting the universal head thereon;
   a cylindrical cam having an axis extending in a substantially horizontal direction and mounted on said base so as to be rotatable about said axis, said cylindrical cam having a cam surface formed on an end thereof;
   transmission means for transmitting force produced due to the inclination of the universal head to said cylindrical cam;
   a compression spring arranged so as to be substantially coaxial with said cylindrical cam and resiliently engaged with said cam surface of said cylindrical cam;
   a spring bearing cylinder fitted on said cylindrical cam so as to be substantially coaxial with said cylindrical cam and slidable thereon, said spring bearing cylinder receiving a side end portion of said compression spring therein to cause actuation of said compression spring to be carried out through sliding movement of said spring bearing cylinder on said cylindrical cam;

said cam surface having a configuration sufficient to cause balance between the force transmitted to said cam surface due to the inclination of the universal head and restoring force of said spring to be maintained at any inclination of the universal head;

a spline shaft arranged so as to be substantially coaxial with said cylindrical cam and rotatable about an axis thereof;

a twist disc fitted on said spline shaft so as to be slidable in an axial direction of said spline shaft and variably engaged with a part of said compression spring; and a spring adjustment casing fixed on said base and receiving another side portion of said compression spring and said twist disc therein, said spring adjustment casing being formed on an inner surface thereof with an internal thread through which said twist disc is variably engaged at an outer periphery thereof with said spring adjustment casing.

10. An equilibrator for a universal head, comprising:

a base for inclinably supporting the universal head thereon;

a cylindrical cam having an axis extending in a substantially horizontal direction and mounted on said base so as to be rotatable about said axis, said cylindrical cam having a cam surface formed on an end thereof;

transmission means for transmitting force produced due to the inclination of the universal head to said cylindrical cam;

a compression spring arranged so as to be substantially coaxial with said cylindrical cam and resiliently engaged with said cam surface of said cylindrical cam;

a spring bearing cylinder fitted on said cylindrical cam so as to be substantially coaxial with said cylindrical cam and slidable thereon, said spring bearing cylinder receiving a side end portion of said compression spring therein to cause actuation of said compression spring to be carried out through sliding movement of said spring bearing cylinder on said cylindrical cam;

said cam surface having a configuration sufficient to allow balance between the force transmitted to said cam surface due to the inclination of the universal head and restoring force of said spring to be maintained at any inclination of the universal head;

a spline shaft arranged so as to be substantially coaxial with said cylindrical cam and rotatable about an axis thereof;

a twist disc fitted on said spline shaft so as to be slidable in an axial direction of said spline shaft and variably engaged with a part of said compression spring;

a spring adjustment casing fixed on said base and receiving another side portion of said compression spring and said twist therein, said spring adjustment casing being formed on an inner surface thereof with an internal thread through which said twist disc is variably engaged at an outer periphery thereof with said spring adjustment casing; and a spring positioning ring for securely positioning a base end of said compression spring opposite to said side end portion of said compression spring received by said spring bearing cylinder.

* * * * *